US008861476B2

(12) United States Patent
Fujimoto et al.

(10) Patent No.: US 8,861,476 B2
(45) Date of Patent: Oct. 14, 2014

(54) PATH SETTING APPARATUS, PATH SETTING METHOD, MANAGEMENT APPARATUS, MANAGEMENT SYSTEM, AND STORAGE DEVICE

(75) Inventors: Naoyuki Fujimoto, Musashino (JP); Tomomi Shimamura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 217 days.

(21) Appl. No.: 13/345,307

(22) Filed: Jan. 6, 2012

(65) Prior Publication Data

US 2012/0182911 A1 Jul. 19, 2012

(30) Foreign Application Priority Data

Jan. 13, 2011 (JP) ................................. 2011-004751

(51) Int. Cl.
*G08C 17/00* (2006.01)
*H04W 16/20* (2009.01)
*H04W 40/10* (2009.01)
*H04W 84/22* (2009.01)
*H04L 12/717* (2013.01)

(52) U.S. Cl.
CPC .............. *H04W 16/20* (2013.01); *H04W 40/10* (2013.01); *H04W 84/22* (2013.01); *H04L 45/42* (2013.01)
USPC ............................ 370/331; 370/351; 370/363

(58) Field of Classification Search
USPC .............................. 370/338, 254, 311; 703/22
See application file for complete search history.

(56) References Cited

U.S. PATENT DOCUMENTS

| 2004/0143428 A1 | 7/2004 | Rappaport et al. | |
| 2005/0117526 A1* | 6/2005 | Melnik | 370/254 |
| 2007/0195715 A1* | 8/2007 | Yamano et al. | 370/254 |
| 2009/0094615 A1* | 4/2009 | Ohno et al. | 719/313 |
| 2009/0097415 A1* | 4/2009 | Shepard et al. | 370/254 |

FOREIGN PATENT DOCUMENTS

| GB | 2452167 A | 2/2009 |
| JP | 2009-111976 A | 5/2009 |
| WO | 03015452 A2 | 2/2003 |

OTHER PUBLICATIONS

European Search Report corresponding to European Patent Application No. 12150212.4, dated Apr. 5, 2012.

* cited by examiner

*Primary Examiner* — Andrew Lai
*Assistant Examiner* — Jamaal Henson
(74) *Attorney, Agent, or Firm* — Sughrue Mion, PLLC

(57) ABSTRACT

A path setting apparatus sets wireless paths fixed by a wireless network formed by a wireless connection device and a plurality of wireless devices. The path setting apparatus may include an editing unit that edits and sets positions of the wireless connection device and the wireless devices and wireless paths between the wireless connection device and the wireless devices and between the wireless devices, and edits and sets communication timings of the wireless connection device and the wireless devices where the wireless paths are set, based on an input instruction, a storage unit that stores power performance information of the wireless devices, and calculating unit that calculates at least one of transmission delays between the wireless devices and the wireless connection device, transmission delays between the wireless devices, consumption power of the wireless devices, and battery life of batteries used as power supplies of the wireless devices.

12 Claims, 7 Drawing Sheets

FIG. 8A

| KIND OF DEVICES | NUMBER |
|---|---|
| NETWORK MANAGING DEVICE | 1 |
| GATEWAY DEVICE | 1 |
| WIRELESS ACCESS POINT DEVICE | x |
| BBR | Y |
| YTA | α |
| ... | |

FIG. 8B

| ID | Role | BATTERY LIFE SPAN ESTIMATION | LATENCY ESTIMATION | ANTENNA HEIGHT |
|---|---|---|---|---|
| 1 | BBR | – | – | ISA100:2.5m WiFi:NONE |
| 2 | RT&IO | FIVE YEARS | 100msec | ISA100:2.5m |
| 3 | RT&IO | FIVE YEARS | 200msec | ISA100:2.5m |
| ... | | | | |

FIG. 8C

| PATH | Primary, Secondary | COMMUNICATION QUALITY (ESTIMATION) | RSSI [dBm] | | | PER [%] | | |
|---|---|---|---|---|---|---|---|---|
| | | | MAX | MIN | AVE | MAX | MIN | AVE |
| 3->1 | Primary | Good | | | | | | |
| 3->4 | Secondary | Poor | | | | | | |
| ... | | | | | | | | |

PATH SETTING APPARATUS, PATH SETTING METHOD, MANAGEMENT APPARATUS, MANAGEMENT SYSTEM, AND STORAGE DEVICE

BACKGROUND OF THE INVENTION

1. Field of the Invention

The present invention relates to a path setting apparatus and a path setting method that set a wireless communication path, a management apparatus and a management system that manage the set wireless path, and a computer readable storage device that has a program for realizing the path setting recorded therein.

Priority is claimed on Japanese Patent Application No. 2011-004751, filed Jan. 13, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, a distributed control system (DCS) where field devices such as a measurer and an operator and a management apparatus for managing and controlling the field devices are connected to each other through a communication bus is constructed in a plant or a factory to realize high automation. The conventional field devices mostly transmit and receive various signals such as a measurement signal and a control signal through a wired communication bus installed at the plant and the like. Recently, wireless field devices that transmit and receive various signals wirelessly in conformity with an industrial wireless communication standard such as ISA100 or WirelessHART have been realized.

ISA100 is a wireless communication standard for industrial automation that was devised by the International Society of Automation (ISA). Since ISA100 is the wireless communication standard used for measurement and control in plants, it is important to realize real-time responsiveness (minimize transmission delay (latency)). Therefore, in the standard of ISA100, a plurality of wireless access point devices (devices that perform wireless communication with the wireless field devices) are provided and the wireless access point devices and the wireless field devices are connected in a one-to-one relationship.

WirelessHART is a wireless communication standard that was proposed by the Highway Addressable Remote Transducer (HART) Communication Foundation of the United States. WirelessHART is based on a sensor network. The sensor network is a wireless network that allows a plurality of wireless terminals with sensors attached to be scattered in a space to make it possible for the wireless terminals to collect environmental and physical situations in cooperation with one another. For this reason, in the standard of WirelessHART, one wireless access point device is provided and a wireless network that is formed in a mesh shape by wireless devices such as a wireless field device and a repeater is connected to the wireless access point device. In WirelessHART, information showing the communication quality of each wireless device is collected by a management apparatus and a wireless path is dynamically switched based on the collected information. Japanese Unexamined Patent Application Publication No. 2009-111976 discloses technology for optimizing a wireless mesh network.

Because there are a plurality of industrial wireless communication standards, a vendor who provides a network infrastructure needs to design and develop a network infrastructure for each standard. In addition, an operator who uses the network infrastructure needs to conserve and manage the network infrastructure using different tools or techniques for each standard. For this reason, the burden of cost for both the vendor and the operator increases. Therefore, recently, a movement to unify the industrial wireless communication standards into one standard has been gaining momentum.

In WirelessHART, the wireless mesh network is formed based on the information indicating the communication quality that is obtained when the wireless device disposed in a field performs communication with surrounding wireless devices or wireless access point devices. For this reason, a wireless path is not determined until the wireless device is actually disposed in the field. Because the transmission delay or the consumption power of the wireless device depends on the wireless path, if the wireless path is not determined when designing a system, the transmission delay or a battery exchange period of the wireless device cannot be estimated. For this reason, when the technology used in WirelessHART is applied to the control of a plant and the like, a problem may occur in terms of real-time responsiveness and maintenance.

In WirelessHART, the wireless path is dynamically switched according to the communication quality of each wireless device, even after the wireless path is determined. For this reason, the transmission delay or the consumption power of the wireless device may momentarily change according to switching of the wireless path. In this case, the transmission delay or the battery exchange period of the wireless device cannot be estimated and a problem may occur in terms of real-time responsiveness and maintenance, similar to the above case.

As in WirelessHART, if the wireless path is dynamically changed according to the communication quality of each wireless device, the operator cannot figure out the actual wireless path. When the operator figures out the actual wireless path, the operator can plan to do the regular work (for example, work for cutting a branch of a tree that has become an obstacle of the wireless communication) or an operative rule (construction regulation of a structure that has become an obstacle of the wireless communication) that is needed to avoid communication obstacles anticipated to be generated in the future. However, when the operator cannot figure out the actual wireless path, problems occur in terms of conservativeness because the operator cannot plan to do the regular work or the operative rule.

SUMMARY

The present invention provides a path setting apparatus and a path setting method through which real-time responsiveness, maintenance, and conservativeness can be secured and wireless paths can be set, a management apparatus and a management system that manage the set wireless paths, and a computer readable storage device that has a program realizing the path setting recorded therein.

A path setting apparatus sets wireless paths fixed by a wireless network formed by a wireless connection device and a plurality of wireless devices. The path setting apparatus may include: an editing unit configured to edit and set positions of the wireless connection device and the wireless devices and wireless paths between the wireless connection device and the wireless devices and between the wireless devices, and to edit and set communication timings of the wireless connection device and the wireless devices where the wireless paths are set, based on an input instruction; a storage unit configured to store power performance information of the wireless devices; and a calculating unit configured to calculate at least one of transmission delays between the wireless devices and the wireless connection device, transmission delays between the wireless devices, consumption power of the wireless devices, and battery life of batteries used as power supplies of the wireless devices, by using the wireless paths and the communication timings set by the editing unit and the power performance information stored in the storage unit.

The power performance information may include first information that shows power consumed when the wireless devices perform communication and second information that shows power consumed when the wireless devices perform a predetermined operation.

The editing unit may set a primary wireless path to be a main wireless path and a secondary wireless path to be an auxiliary wireless path, with respect to each of the wireless devices.

The editing unit may edit and set heights of positions of the wireless connection device and the wireless devices.

The path setting apparatus may further include: a display unit configured to display the wireless connection device, the wireless devices, and the wireless paths, which are edited by the editing unit, and structures, which are positioned around the wireless connection device and the wireless devices, in a state in which the wireless connection device, the wireless devices, the wireless paths, and the structures overlap in a plan view or a side view.

A management apparatus manages a wireless network formed by a wireless connection device and a plurality of wireless devices. The management apparatus transmits a control signal to each of the plurality of wireless devices to fix wireless paths equal to the wireless paths set by the path setting apparatus.

The management apparatus may include the wireless connection device.

A management system manages a wireless network formed by a wireless connection device and a plurality of wireless devices. The management system may include: the path setting apparatus; and the management apparatus.

A path setting method sets wireless paths fixed by a wireless network formed by a wireless connection device and a plurality of wireless devices. The path setting method may include: a first step that edits and sets positions of the wireless connection device and the wireless devices and wireless paths between the wireless connection device and the wireless devices and between the wireless devices, and edits and sets communication timings of the wireless connection device and the wireless devices where the wireless paths are set, based on an input instruction; and a second step that calculates at least one of transmission delays between the wireless devices and the wireless connection device, transmission delays between the wireless devices, consumption power of the wireless devices, and battery life of batteries used as power supplies of the wireless devices, by using the wireless paths and the communication timings set in the first step and the power performance information of the wireless devices.

The power performance information may include first information that shows power consumed when the wireless devices perform communication and second information that shows power consumed when the wireless devices perform a predetermined operation.

In the first step, a primary wireless path can be set to be a main wireless path and a secondary wireless path can be set to be an auxiliary wireless path, with respect to each of the wireless devices.

In the first step, heights of positions of the wireless connection device and the wireless devices can be set and edit.

The path setting method may further include displaying the wireless connection device, the wireless devices, and the wireless paths, which are edited in the first step, and structures, which are positioned around the wireless connection device and the wireless devices, in a state in which the wireless connection device, the wireless devices, the wireless paths, and the structures overlap in a plan view or a side view.

A management apparatus manages a wireless network formed by a wireless connection device and a plurality of wireless devices. The management apparatus may transmit a control signal to each of the plurality of wireless devices to fix wireless paths equal to the wireless paths set by the path setting apparatus.

A management system manages a wireless network formed by a wireless connection device and a plurality of wireless devices. The management system may include: the path setting apparatus; and the management apparatus.

A computer-readable storage device storing a path setting program causes the computer to serve as: an editing means that edits and sets positions of the wireless connection device and the wireless devices and wireless paths between the wireless connection device and the wireless devices and between the wireless devices, and edits and sets communication timings of the wireless connection device and the wireless devices where the wireless paths are set, based on an input instruction; a storage means that stores power performance information of the wireless devices; and a calculating means that calculates at least one of transmission delays between the wireless devices and the wireless connection device, transmission delays between the wireless devices, consumption power of the wireless devices, and battery life of batteries used as power supplies of the wireless devices, by using the wireless paths and the communication timings set by the editing means and the power performance information stored by the storage means.

The power performance information may include first information that shows power consumed when the wireless devices perform communication and second information that shows power consumed when the wireless devices perform a predetermined operation.

The editing means may set a primary wireless path to be a main wireless path and a secondary wireless path to be an auxiliary wireless path, with respect to each of the wireless devices.

The editing means may edit and set heights of positions of the wireless connection device and the wireless devices.

The computer-readable storage device storing the path setting program may further include: a display means that displays the wireless connection device, the wireless devices, and the wireless paths, which are edited by the editing means, and structures, which are positioned around the wireless connection device and the wireless devices, in a state in which the wireless connection device, the wireless devices, the wireless paths, and the structures overlap in a plan view or a side view.

According to the present invention, an editing unit edits and sets positions of the wireless connection device and the wireless devices and wireless paths between the wireless devices and edits and sets communication timings of the wireless devices where the wireless paths are set, according to an input instruction. A calculating unit calculates at least one of transmission delays between the wireless devices, consumption power of the wireless devices, and battery life of batteries used as power supplies of the wireless devices, using the wireless paths and the communication timings set by the editing unit and power performance information stored in a storage unit.

According to the present invention, the editing unit edits and sets the positions of the wireless devices and the wireless paths between the wireless devices and edits and sets the communication timings of the wireless devices where the wireless paths are set, according to an input instruction. The calculating unit calculates at least one of the transmission delays between the wireless devices, the consumption power of the wireless devices, and the battery life of the batteries used as the power supplies of the wireless devices, using the wireless paths and the communication timings set by the editing unit and the power performance information stored in the storage unit. Thereby, since the wireless paths, the transmission delays, and the consumption power can be known in a design step, real-time responsiveness, maintenance, and conservativeness can be secured.

BRIEF DESCRIPTION OF THE DRAWINGS

The above features and advantages of the present invention will be more apparent from the following description of certain preferred embodiments taken in conjunction with the accompanying drawings, in which:

FIG. 8A is a diagram illustrating the total number table file;

FIG. 8B is a diagram illustrating the device list file; and

FIG. 8C is a diagram illustrating the transmission path plan table file.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
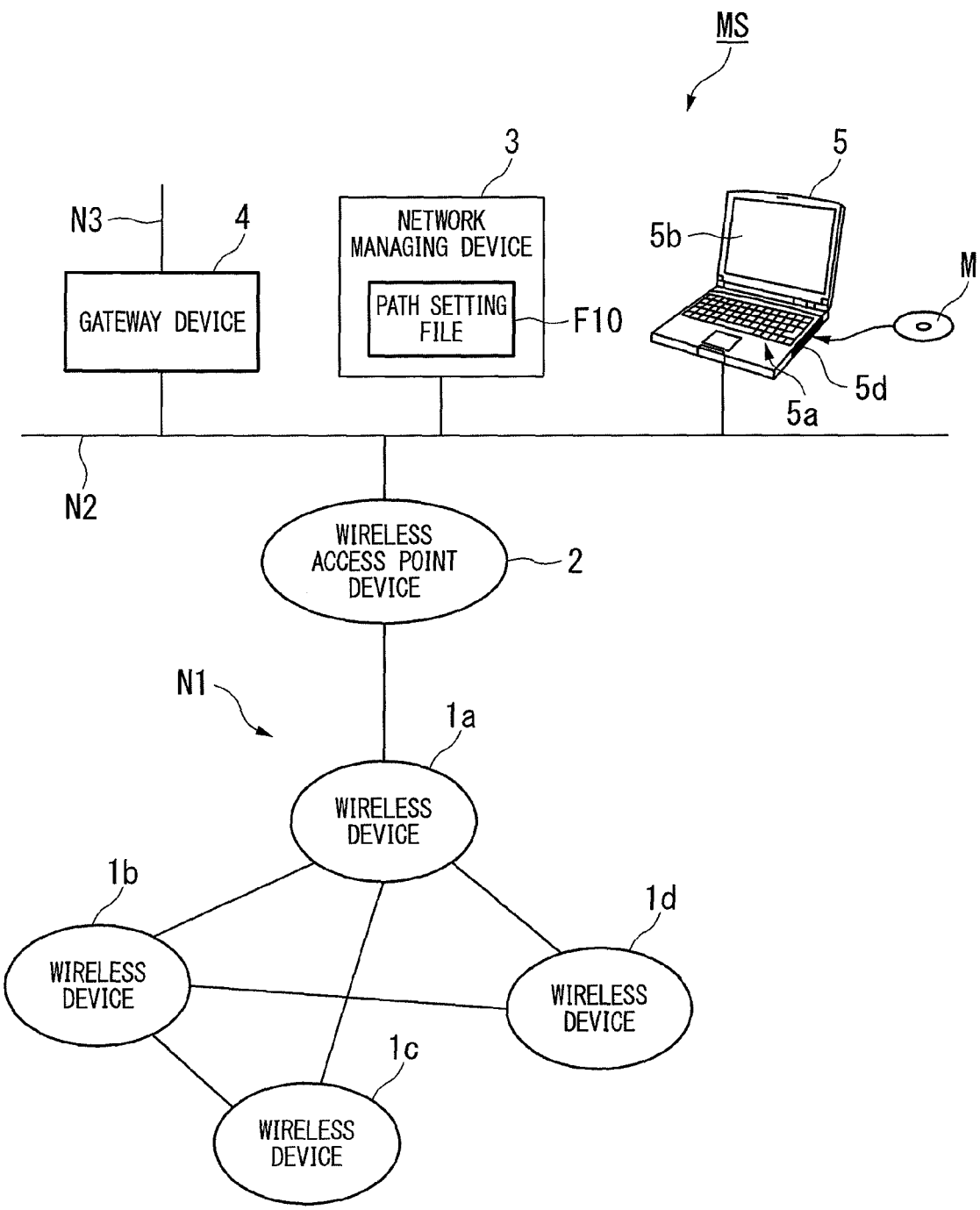
FIG. 1 is a diagram illustrating the entire configuration of a management system in accordance with a first preferred embodiment of the present invention.

Hereinafter, a path setting apparatus, a path setting method, a management apparatus, a management system, and a storage device in accordance with a first preferred embodiment of the present invention will be described with reference to the drawings. FIG. 1 is a diagram illustrating the entire configuration of the management system in accordance with the first preferred embodiment of the present invention. As shown in FIG. 1, a management system MS in accordance with the first preferred embodiment of the present invention includes wireless devices 1a to 1d, a wireless access point device 2 (wireless connection device), a network management apparatus 3 (management apparatus), a gateway device 4, and a path setting apparatus 5. The wireless devices 1a to 1d and the wireless access point device 2 form a wireless network N1. The network management apparatus 3 manages the wireless network N1. FIG. 1 shows the four wireless devices 1a and 1d. However, the number of wireless devices may be arbitrarily set.

The wireless devices 1a to 1d are wireless field devices such as a sensor device such as a flow meter or a temperature sensor, a valve device such as a flow control valve or a switching valve, and an actuator device such as a fan or a motor, which are arranged in a plant or a factory, and conform wireless communication to ISA100.11a or WirelessHART. Each of the wireless devices 1a to 1d has a function of a repeater and can perform wireless communication with the wireless access point device 2 and wireless communication with the other wireless devices. An operation of each of the wireless devices 1a to 1d is controlled based on control data transmitted from the network management apparatus 3 through the wireless access point device 2. Measurement data that is obtained by the wireless devices 1a to 1d is collected in the network management apparatus 3 through the wireless access point device 2.

The wireless access point device 2 connects the wireless network N1 to which the wireless devices 1a to 1d are connected and a backbone network N2 to which the network management apparatus 3, the gateway device 4, and the path setting apparatus 5 are connected and relays a variety of data transmitted and received between the wireless devices 1a to 1d and the network management apparatus 3. The wireless access point device 2 also performs the wireless communication based on ISA100.11a or WirelessHART.

The network management apparatus 3 manages the wireless network N1 that is formed by the wireless devices 1a to 1d and the wireless access point device 2. Specifically, the network management apparatus 3 transmits a control signal to the wireless devices 1a to 1d and the wireless access point device 2, based on a path setting file F10, and fixes wireless paths equal to wireless paths set in the path setting file F10 between the wireless devices 1a to 1d and between the wireless devices 1a to 1d and the wireless access point device 2. The path setting file F10 is generated by an operator (for example, a designer who designs the management system MS) operating the path setting apparatus 5 and defines the wireless paths that are fixed by the wireless network N1.

By managing the wireless paths fixed by the wireless network N1 using the path setting file F10, the management system MS secures real-time responsiveness, maintenance, and conservativeness. By defining the wireless paths in a design step of the management system MS and prohibiting the dynamic change of the wireless paths as in WirelessHART to enable accurate estimation of transmission delays the wireless devices 1a to 1d or battery exchange periods, the real-time responsiveness and the maintenance are secured. If the wireless paths are accurately understood to enable planning of the regular work or the operative rule, the conservativeness is secured.

The network management apparatus 3 performs control (for example, control of switching of the valve) of the wireless devices 1a to 1d connected to the wireless network N1 and collection of the measurement data measured by the wireless devices 1a to 1d connected to the wireless network N1, while performing communication with the wireless devices 1a to 1d through the wireless access point device 2. In addition, the network management apparatus 3 executes a participation process on whether or not to allow a new wireless device to participate in the wireless network N1.

The gateway device 4 connects the backbone network N2 and a control network N3 to which an upper management apparatus (not shown in the drawings) realizing a distributed control system (DCS) is connected and relays a variety of data transmitted and received between the wireless devices 1a to 1d or the network management apparatus 3 and the upper management apparatus. The path setting apparatus 5 sets the wireless paths to be fixed by the wireless network N1 formed by the wireless devices 1a to 1d and the wireless access point device 2 and generates the path setting file F10.

The path setting apparatus 5 is realized by a notebook-type personal computer that includes an input device 5a such as a keyboard or a pointing device, a display device 5b such as a liquid crystal display device, a communication device 5c (not shown in FIG. 1, refer to FIG. 2), and a drive device 5d. The drive device 5d reads data that is recorded on a computer readable storage device M1, such as a CD-ROM or a DVD-ROM. A function (editing/setting function of the wireless paths) of the path setting apparatus 5 is realized in terms of software by reading a program (path setting program) recorded in the storage device M by the drive device 5d and installing the program.

Figure 2:
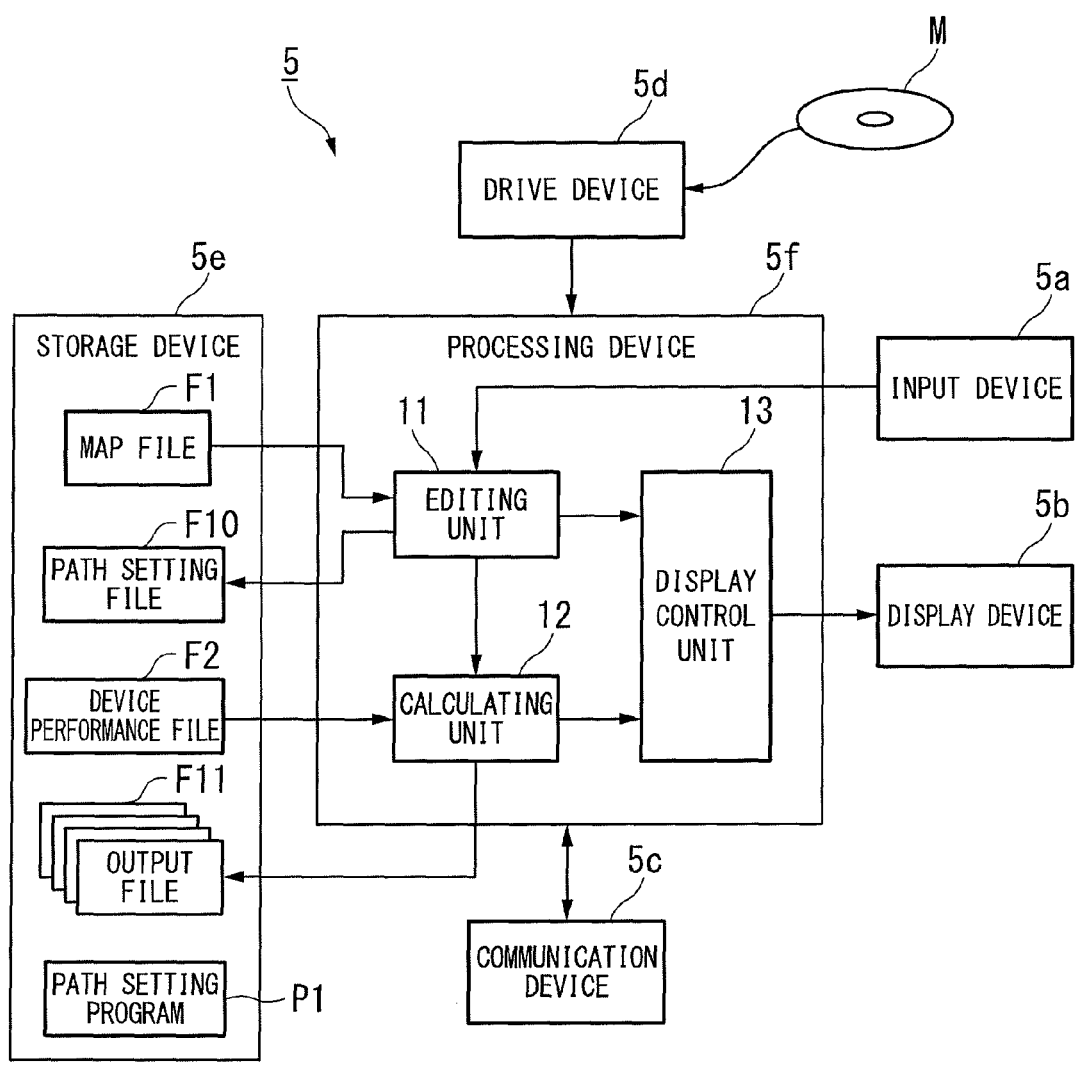
FIG. 2 is a block diagram illustrating the configuration of a main portion of a path setting apparatus in accordance with the first preferred embodiment of the present invention.

FIG. 2 is a block diagram illustrating the configuration of a main portion of the path setting apparatus in accordance with the first preferred embodiment of the present invention. As shown in FIG. 2, the path setting apparatus 5 in accordance with the first preferred embodiment of the present invention includes a storage device 5e (storage unit/storage units) and a processing device 5f, in addition to the input device 5a, the display device 5b, the communication device 5c, and the drive device 5d. The storage device 5e is an external storage device such as a hard disk and stores various files such as a map file F1, a device performance file F2, a path setting file F10, and an output file F11, in addition to an installed path setting program P1 that is read from the storage device M by the drive device 5d.

The map file F1 is a file that stores map information (map) of places where the wireless devices 1a to 1d and the wireless access point device 2 are arranged. For example, when the arrangement places of the wireless devices 1a to 1d are inside a site such as a plant, the map file F1 stores map information that shows the arrangement of various devices (structures) arranged inside the site. When the arrangement places of the wireless devices 1a to 1d are outside the site such as the plant, the map file F1 stores map information that shows surrounding buildings (structures).

The device performance file F2 is a file that stores information showing various performances of the wireless devices 1a to 1d and the wireless access point device 2. Specifically, the device performance file F2 stores power performance information that shows power performances of the wireless devices 1a to 1d and the wireless access point device 2, communication performance information that shows communication performances thereof, and other information. The power performance information includes the consumption power at the time of transmission (first information) that shows power consumed when data is transmitted, a consumption power at the time of reception (first information) that shows the amount of power consumed when data is received, the consumption power at the time of driving a sensor and the like (second information) that shows the power consumed when the sensor or an actuator is driven, and the consumption power at the time of detection by the sensor (second information) that shows the amount of power consumed when a measured amount is detected by the sensor. The communication performance information includes information showing the minimum transmission delay or a wireless communication enabled distance.

As described above, the path setting file F10 is a file where the wireless paths fixed by the wireless network N1 are defined. The path setting file F10 is generated by the operator operating the path setting apparatus 5. The output file F11 is a file where a variety of information relating to the wireless paths set by the path setting apparatus 5 is stored. The output file F11 includes an arrangement plan view file, a side view file, a total number table file, a device list file, and a transmission path plan table file. The output file F11 is used to provide performance of the management system MS to the operator in the design step.

The arrangement plan view file is a file that stores a plan view (arrangement plan view) showing arrangement schedule positions of the wireless devices 1a to 1d. Specifically, the arrangement plan view file stores an arrangement plan view where the arrangement schedule positions of the wireless devices 1a to 1d or the wireless paths fixed between the wireless devices 1a to 1d overlap in the map information showing the structures positioned around the wireless devices 1a to 1d in plan view. The side view file is a file that stores a side view showing the arrangement schedule positions of the wireless devices 1a to 1d. Specifically, the side view file stores a side view where the structures positioned around the wireless devices 1a to 1d, the wireless devices 1a to 1d, and the wireless paths fixed between the wireless devices 1a to 1d overlap in the side view.

The total number table file is a file that stores information showing the total number of all of the devices constituting the management system MS including the wireless devices 1a to 1d in which the wireless paths are set. The device list file is a file that stores detailed information on the wireless devices 1a to 1d forming the management system MS. Specifically, the device list file stores information that shows a battery life or transmission delay (latency) estimated for each of the wireless devices 1a to 1d and information that shows the height of an antenna set to each of the wireless devices 1a to 1d. The transmission path plan table file is a file that stores information showing a communication quality for each wireless path set between the wireless devices 1a to 1d.

The processing device 5f is a central processing unit (CPU) and wholly controls an operation of the path setting apparatus 5. When power is supplied to the path setting apparatus 5 or an instruction is given by the operator who operates the path setting apparatus 5, the processing device 5f reads the path setting program P1 stored in the storage device 5e and executes the path setting program P1 to realize the editing unit 11 (editing means), the calculating unit 12 (calculating means), and the display control unit 13 (display unit/display means) shown in FIG. 2.

The editing unit 11 edits and sets the arrangement positions of the wireless devices 1a to 1d and the wireless access point device 2, the wireless paths between the wireless devices 1a to 1d and the wireless access point device 2, and the wireless paths between the wireless devices 1a to 1d, according to an input instruction given by the operator operating the input device 5a. The editing unit 11 edits and sets the communication timings of the wireless devices 1a to 1d and the wireless access point device 2 where the wireless paths are set, according to an input instruction given by the operator operating the input device 5a.

Specifically, the editing unit 11 reads the map file F1 that is stored in the storage device 5e, controls the display control unit 13, and displays an editing screen (editing window) where map information is displayed in the background of the display device 5b. In addition, the editing unit 11 edits the wireless paths according to an input instruction given by the operator in the editing window, and generates the path setting file F10 when a setting instruction of the wireless paths is given by the operator.

In this case, the editing unit 11 can set a main wireless path (primary wireless path) and an auxiliary wireless path (secondary wireless path) to each of the wireless devices 1a to 1d. The main wireless path is a wireless path which is normally used. The auxiliary wireless path is a wireless path that is used when an abnormality occurs and the wireless communication through the main wireless path cannot be performed. The editing unit 11 can edit and set the heights of the wireless devices 1a to 1d and the wireless access point device 2. Since the heights can be edited and set, the wireless paths can be set to avoid buildings between the wireless devices 1a to 1d.

The editing unit 11 edits and sets communication timings of the wireless devices 1a to 1d and the wireless access point device 2 according to an input instruction from the operator after the wireless paths are set (scheduling). Specifically, since the wireless devices 1a to 1d and the wireless access point device 2 can perform wireless communication using 16 channels, the editing unit 11 edits and sets a channel and timing used at the time of communication to minimize transmission delay of each of the wireless devices 1a to 1d or not to exceed a control period of process control.

The calculating unit 12 calculates the transmission delays between the wireless devices 1a to 1d and the wireless access point device 2 or between the wireless devices 1a to 1d, the consumption power of the wireless devices 1a to 1d, and the battery life of the wireless devices 1a to 1d, using the wireless paths and the communication timings set by the editing unit 11 and the device performance file F2 stored in the storage device 5e. In addition, the calculating unit 12 generates the output file F11 based on the calculation result or controls the display control unit 13 according to an instruction from the operator to display the calculation result in the display device 5b. However, the calculating unit 12 does not need to calculate all of the transmission delay, the consumption power, and the battery life and may calculate one or more of the transmission delay, the consumption power, and the battery life, according to necessity.

The display control unit 13 performs display control on the display device 5b to provide a graphical user interface (GUI), under the editing unit 11 or the calculating unit 12. For example, the display control unit 13 displays the wireless devices 1a to 1d, the wireless access point device 2, and the wireless paths edited by the editing unit 11 and the structures positioned around the wireless devices 1a to 1d and the wireless access point device 2, in a state in which the wireless devices, the wireless access point device, and the wireless paths and the structures overlap in a plan view or side view. By performing the display in the above-described manner, the arrangement positions of the wireless devices 1a to 1d and the wireless access point device 2 and the wireless paths fixed between the wireless devices 1a to 1d and the wireless access point device 2 can be easily confirmed.

Figure 3:
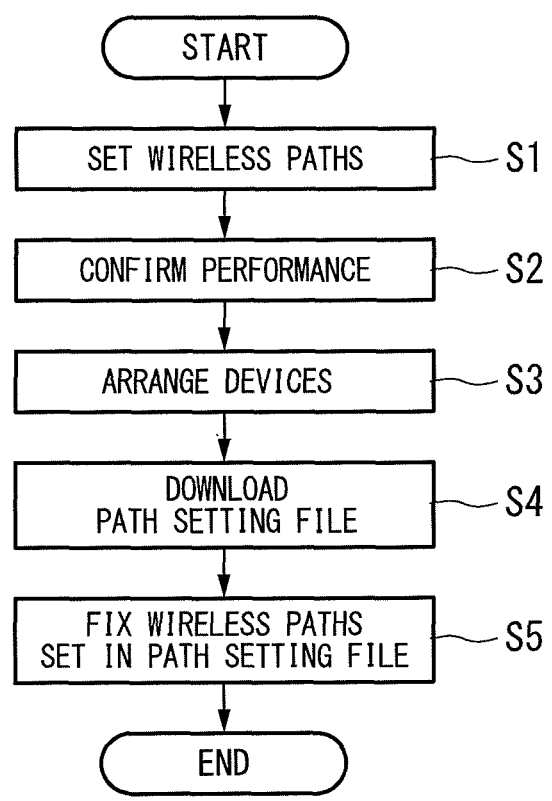
FIG. 3 is a flowchart illustrating a schematic sequence of realizing the management system in accordance with the first preferred embodiment of the present invention.

Next, a sequence of realizing the management system MS described above will be described. FIG. 3 is a flowchart illustrating a schematic sequence of realizing the management system in accordance with the first preferred embodiment of the present invention. As shown in FIG. 3, the management system MS is realized mainly by a setting process of the wireless paths or the like (process S1), a performance confirmation process of the management system MS (process S2), an arrangement process of the devices (process S3), a download process of the path setting file F10 (process S4), and a fixing process of the wireless paths (process S5).

The setting process of the wireless paths and the like (process S1) is a process for designing the wireless network N1 realized mainly by the management system MS shown in FIG. 1. Specifically, in the setting process of the wireless paths and the like (process S1), the operator operates the path setting apparatus 5 and executes processes according to a flowchart shown in FIG. 4 in the path setting apparatus 5. As a result, editing and setting of the arrangement positions of the wireless devices 1a to 1d and the wireless access point device 2, editing and setting of the wireless paths between the wireless devices 1a to 1d and the wireless access point device 2, and editing and setting of the communication timings of the wireless devices 1a to 1d and the wireless access point device 2 where the wireless paths are set are performed.

Figure 4:
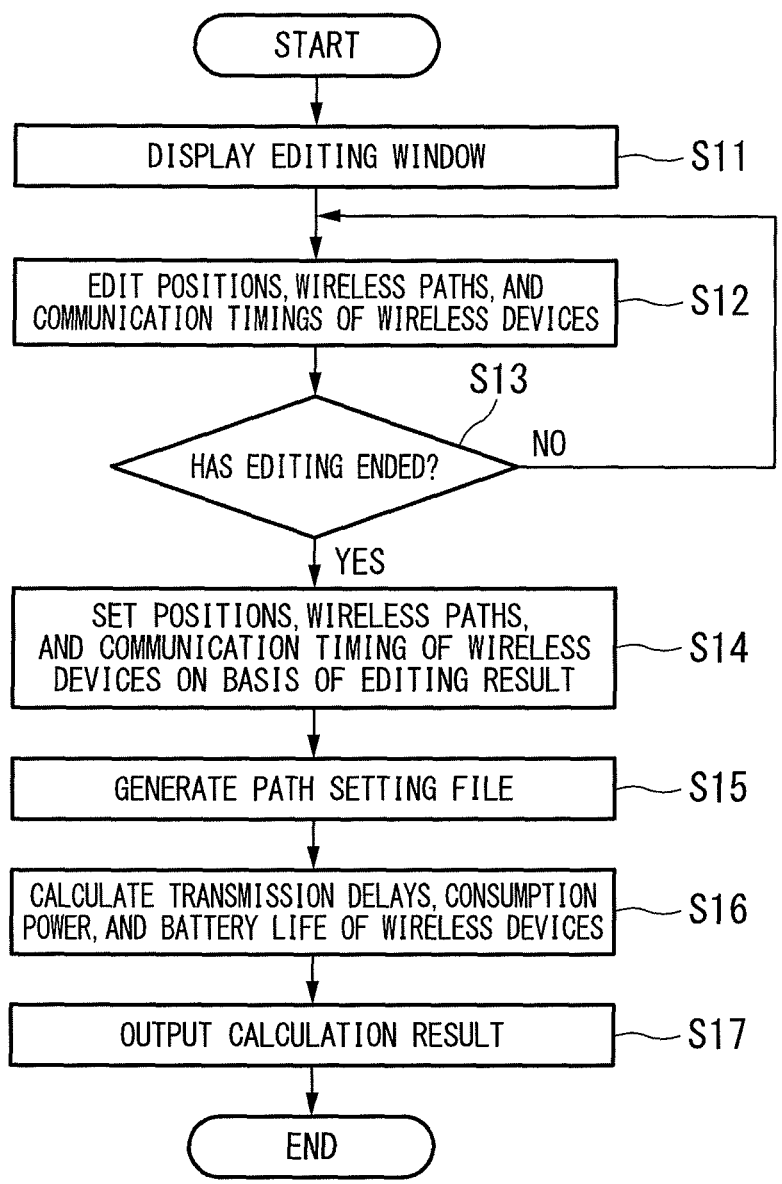
FIG. 4 is a flowchart illustrating a path setting method in accordance with the first preferred embodiment of the present invention.

FIG. 4 is a flowchart illustrating a path setting method in accordance with the first preferred embodiment of the present invention. The flowchart shown in FIG. 4 starts when the operator supplies power to the path setting apparatus 5 or instructs the path setting apparatus 5 to execute the path setting program P1. If the path setting program P1 is read from the storage device 5e and is executed by the processing device 5f, the editing unit 11, the calculating unit 12, and the display control unit 13 shown in FIG. 2 are realized.

In this state, if the operator operates the input device 5 and instructs to select the map file F1 of the arrangement places of the wireless devices 1a to 1d, the selected map file F1 is read from the storage device 5e by the editing unit 11. In this case, the display control unit 13 is controlled by the editing unit 11. The editing window, where the map information stored in the read map file F1 is displayed in the background, is displayed on the display device 5b (step S11).

Figure 5:
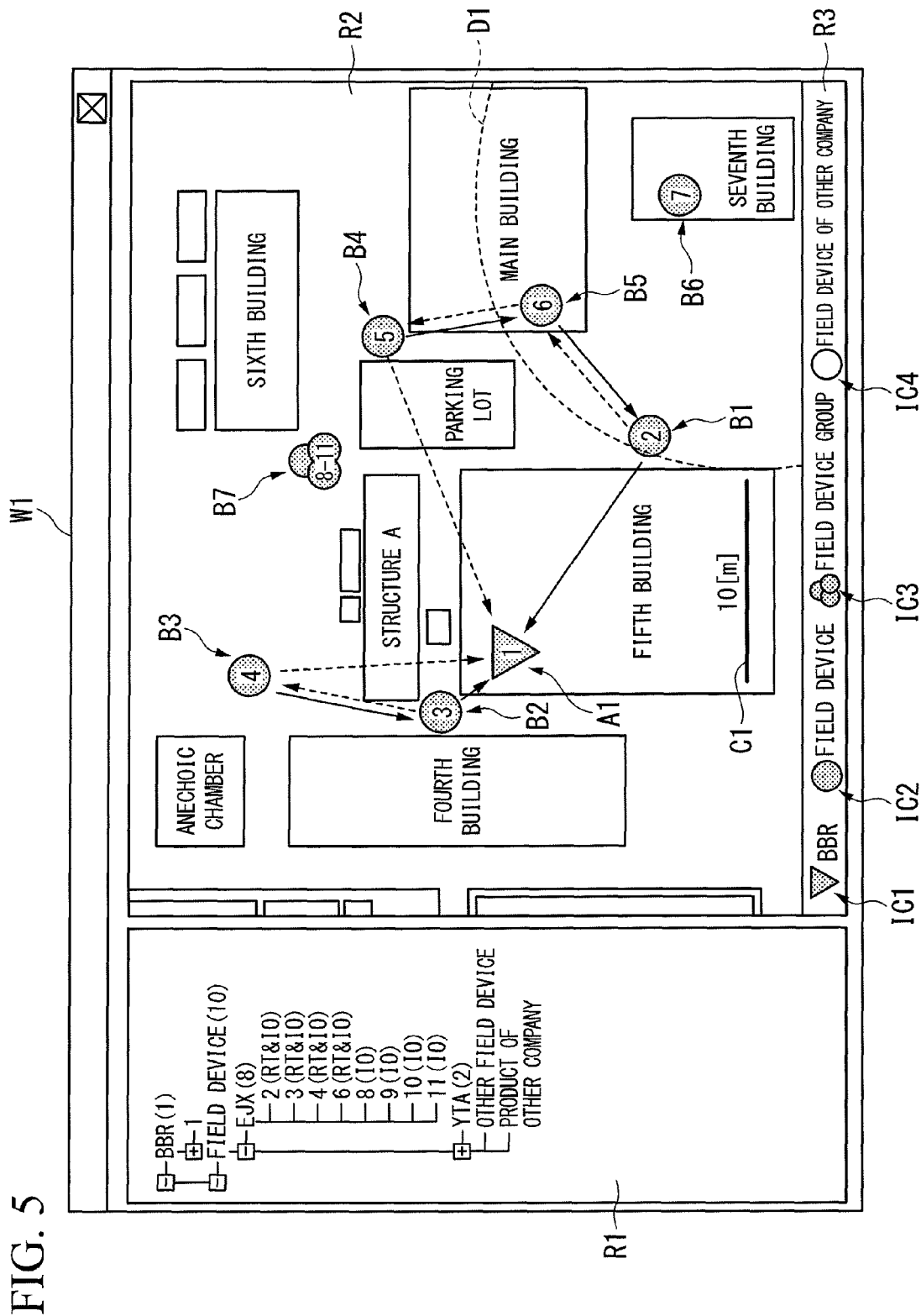
FIG. 5 is a diagram illustrating the editing window that is displayed on the path setting apparatus in accordance with the first preferred embodiment.

If the editing window is displayed, editing of the arrangement positions of the wireless devices 1a to 1d and the wireless access point device 2, editing of the wireless paths between the wireless devices 1a to 1d and the wireless access point device 2, and editing of the communication timings of the wireless devices 1a to 1d and the wireless access point device 2 where the wireless paths are set are performed by the editing unit 11, according to an operation of the input device 5a by the operator (step S12: first step). FIG. 5 is a diagram illustrating the editing window that is displayed on the path setting apparatus in accordance with the first preferred embodiment.

As shown in FIG. 5, a device list display region R1, an editing region R2, and an editing menu display region R3 are provided in an editing window W1 displayed on the path setting apparatus 5. In the device list display region R1, wireless devices and a wireless access point device that are arranged in the editing region R2 according to the operation of the operator are displayed in a form of a tree. In an example shown in FIG. 5, one wireless access point device (BBR) and 10 wireless devices (field devices) are displayed. The wireless devices are collectively displayed for each type of the wireless devices or each vendor providing the wireless devices.

In the editing region R2, the map information that is stored in the map file F1 read in step S11 described above is displayed in the background. Thereby, the positions of the wireless devices 1a to 1d and the wireless access point device 2 and the wireless paths between the wireless devices 1a to 1d and the wireless access point device 2 can be edited two-dimensionally. In the example shown in FIG. 5, structures such as a "main building," a "parking lot," and a "fifth building" are displayed in the background and an icon A1 and icons B1 to B7 that each show the wireless access point device and the wireless devices arranged according to an instruction from the operator and the wireless paths (paths shown by a solid line arrow or a wavy line arrow) defined according to an instruction from the operator are displayed in a state in which the icons and the wireless paths overlap in the background in a plan view. In FIG. 5, the path that is shown by the solid line arrow is a main wireless path and the path that is shown by the wavy line arrow is an auxiliary wireless path.

In the editing region R2, in addition to the background and the icons A1 and B1 to B7, information to facilitate the editing work of the operator can be displayed according to an instruction from the operator. For example, a scale C1, which has a length changing according to an enlargement ratio of the background displayed in the editing region R2, or a communication enabled range D1 for each wireless device can be displayed according to an instruction from the operator. If the operator refers to the scale C1 or the communication enabled range D1, the editing work is facilitated because distances or positional relationships of the wireless devices and the wireless access point device can be easily understood.

In the editing menu display region R3, the icons of the wireless access point device and the wireless devices that can be arranged in the editing region R2 are displayed. In the example shown in FIG. 5, an inverted triangular icon IC1 that shows a wireless access point (BBR), a circular icon IC2 that shows a wireless device (field device), an icon IC3 including three circles that shows a wireless device group (field device group), and a circular icon IC4 that shows a wireless device of another company are displayed in the editing menu display region R3. An icon that shows the scale C1 or the communication enabled range D1 may be provided in the editing menu display region R3.

In the editing window W1, if the operator performs a specific operation (for example, an operation of dragging and dropping the icons in the editing region R2) with respect to the icons IC1 to IC4 displayed in the editing menu display region R3 using the input device 5a, the wireless device or the wireless access point device can be newly arranged in the editing region R2. The wireless device or the wireless access point device that is newly arranged in the editing region R2 is added to the device list display region R1. If the operator performs an operation of moving the icons A1 and B1 to B7 already displayed in the editing region R2, the positions of the wireless access point device and the wireless devices can be changed.

In addition, the wireless paths can be set by performing an operation to select a communication origin and a communication destination, with respect to the icons A1 and B1 to B7 already displayed in the editing region R2. For example, in the example shown in FIG. 5, if the icon B1 is selected as the communication origin and the icon A1 is selected as the communication destination, a wireless path from the wireless device shown by the icon B1 to the wireless access point device shown by the icon A1 can be defined. Likewise, if the icon B1 is selected as the communication origin and the icon B5 is selected as the communication destination, a wireless path from the wireless device shown by the icon B1 to the wireless device shown by the icon B5 can be defined. According to an instruction from the operator, it is set whether the defined wireless path is used as the main wireless path or the auxiliary wireless path.

Figure 6:
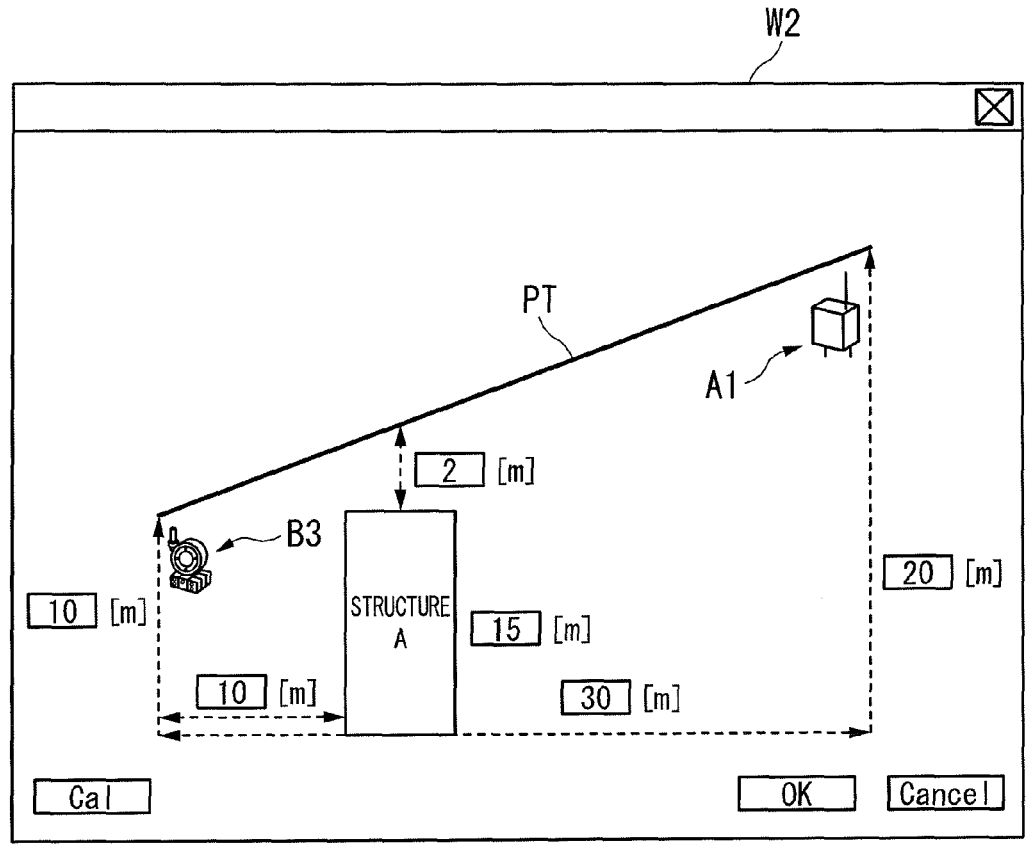
FIG. 6 is a diagram illustrating another editing window that is displayed on the path setting apparatus in accordance with the first preferred embodiment of the present invention.

If the operator performs a specific operation (for example, a right click operation) with respect to the wireless path defined in the editing region R2, an editing window W2 shown in FIG. 6 is displayed and the heights of the wireless devices and the wireless access point device can be edited. FIG. 6 is a diagram illustrating another editing window that is displayed on the path setting apparatus in accordance with the first preferred embodiment of the present invention. The editing window W2 shown in FIG. 6 is displayed when a specific operation is performed with respect to the wireless path between the icons A1 and B3 displayed in the editing region R2 of the editing window W1.

In an example shown in FIG. 6, the wireless device shown by the icon B3, the wireless access point device shown by the icon A1, a "structure A" positioned between the wireless device and the wireless access point device, and a wireless path PT defined between the wireless device and the wireless access point device are displayed in an overlapped state as seen from a side view. In addition, input boxes to input the heights and the distances of the wireless device shown by the icon B3, the wireless access point device shown by the icon A1, and the "structure A" are displayed. If values of the input boxes displayed in the window W2 change, a positional relationship between the wireless path PT and the "structure A" automatically changes according to the input values. Thereby, it can be confirmed whether the "structure A" interferes with the wireless path PT.

Figure 7:
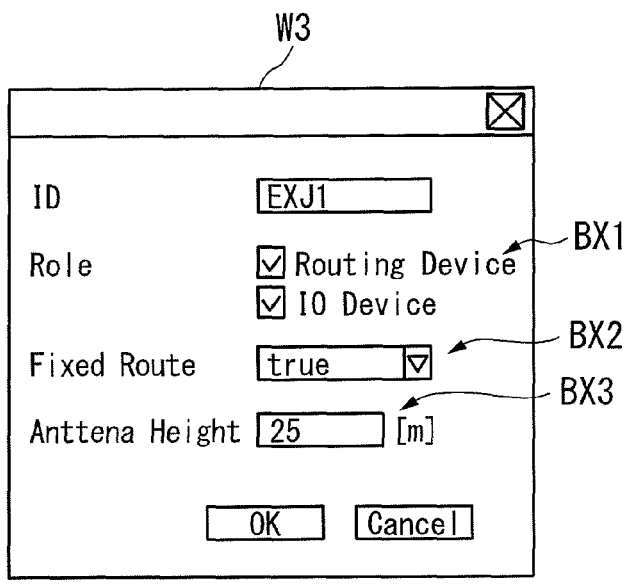
FIG. 7 is a diagram illustrating a device setting window that is displayed on the path setting apparatus in accordance with the first preferred embodiment of the present invention.

If the operator performs a specific operation (for example, a right click operation) with respect to the wireless device arranged in the editing region R2, a device setting window W3 shown in FIG. 7 is displayed and the wireless device can be set. FIG. 7 is a diagram illustrating a device setting window that is displayed on the path setting apparatus in accordance with the first preferred embodiment of the present invention. In example shown in FIG. 7, check boxes BX1 and input boxes BX2 and BX3 are provided in the device setting window W3.

The check boxes BX1 are used to set a function of the wireless device such as whether the wireless device has a relay function or the wireless device is an IO device. The input box BX2 is used to set whether the wireless path is fixed or the wireless path is dynamically switched according to the surrounding wireless environment. The input box BX3 is used to set the antenna height of the wireless device. The input box BX3 is linked with the input box to input the height of the wireless device in the editing window W2 shown in FIG. 6. By performing the same operation on the wireless access point device arranged in the editing region R2, the antenna height of the wireless access point device can be set.

If editing of the wireless paths using the editing windows W1 and W2 or the device setting window W3 is performed, editing (scheduling) of the communication timings is performed according to an operation of the input device 5a by the operator. Specifically, one of a plurality of channels (for example, 16 channels) available for the wireless communication and communication timing that are used at the time of the communication are edited according to an operation from the operator, to minimize transmission delay of each wireless device or not to exceed a control period of process control, according to contents of the process control which the operator desires to perform.

During editing of the wireless paths and editing of the wireless devices, the editing unit 11 of the path setting apparatus 5 determines whether an editing end instruction is given by the operator (step S13). When the editing end instruction is not given by the operator, the determination result becomes "NO" and the process of step S12 is repeated according to an instruction from the operator. When the editing end instruction is given by the operator, the determination result of step S13 becomes "YES" and the positions of the wireless devices, the wireless paths, and the communication timings based on the editing result of step S12 are set (step S14: first step). If the setting is performed, the path setting file F10 in which setting contents are reflected is generated by the editing unit 11 and is stored in the storage device 5e (step S15).

If the above processes end, then the setting contents of step S14 are output from the editing unit 11 to the calculating unit 12, the device performance file F2 that is stored in the storage device 5e is read by the calculating unit 12, and a process is executed for calculating the transmission delays between the wireless devices and the wireless access point device or between the wireless devices, the consumption power of the wireless devices, and the battery life of the wireless devices (step S16: second step).

Specifically, the transmission delays between the wireless devices and the wireless access point device or between the wireless devices are calculated using the wireless paths set by the editing unit 11 and the communication timings for every wireless device. For example, when the wireless path from the wireless device 1c shown in FIG. 1 to the wireless access point device 2 through the wireless device 1a is set, a time that is needed to perform communication between the wireless device 1c and the wireless device 1a and a time that is needed to perform communication between the wireless device 1a and the wireless access point device 2 can be ignored. Therefore, delay times for the wireless devices 1c and 1a based on the communication timings set to the wireless devices 1c and 1a are summed up and transmission delay is calculated. For example, the delay time of the wireless device 1c is a time until transmission of a measurement value to the wireless device 1a starts after the measurement value is acquired. The delay time of the wireless device 1a is a time until transmission of the measurement value to the wireless access point device 2 starts after the measurement value is received from the wireless device 1c.

In addition, the consumption power (unit time consumption power) of the wireless device is calculated using the power performance information (the consumption power at the time of transmission, the consumption power at the time of reception, the consumption power at the time of driving the sensor and the like, and the consumption power at the time of detection by the sensor) stored in the device performance file F2 and the scheduling result, as represented by the following Equation 1. In the following Equation 1, values that are determined by the scheduling result are a "number of transmissions per unit time" and a "number of receptions per unit time."

$$\text{Unit time consumption power} = \text{consumption power at time of transmission} \times \text{number of transmissions per unit time} + \text{consumption power at time of reception} \times \text{number of receptions per unit time} + \text{consumption power at time of driving sensor, etc.} \times \text{number of drivings per unit time} + \text{consumption power at time of detection by sensor} \times \text{number of detections per unit time} \quad [\text{Equation 1}]$$

The battery life is calculated using the unit time consumption power calculated from the above Equation 1, as represented by the following Equation 2.

$$\text{Battery life} = (\text{initial battery capacity} \div \text{unit time consumption power}) \times \text{unit time} \quad [\text{Equation 2}]$$

The initial battery capacity in the above equation 2 is a remaining battery capacity when a battery is a new product and is used when the new battery is used. When the battery has already been used and the remaining battery capacity decreases, the battery life is calculated using the remaining battery capacity calculated from the following Equation 3, instead of the initial battery capacity in the above Equation 2. A "wireless device operating time" in the following Equation 3 is obtained by representing an operating time of the wireless device in a time unit (for example, a unit of seconds) of the "unit time consumption power."

$$\text{Remaining battery capacity} = \text{initial battery capacity} - (\text{unit time consumption power} \times \text{wireless device operating time}) \quad [\text{Equation 3}]$$

If the above processes end, the calculation result of the calculating unit 12 is output to the storage device 5e and is stored as the output file F11 or the display control unit 13 is controlled by the calculating unit 12 and the calculation result of the calculating unit 12 is displayed on the display device 5b (step S17). In this case, the output file F11 includes the arrangement plan view file, the side view file, the total number table file, the device list file, and the transmission path plan table file, as described above. In the arrangement plan view file, the same contents as the contents that are displayed in the editing region R2 when editing using the editing window W1 shown in FIG. 5 is ended are stored. In the side view file, the contents that are shown in FIG. 6 are stored.

In the total number table file, the device list file, and the transmission path plan table file, the contents shown in FIGS. 8A to 8C are stored, respectively. FIGS. 8A to 8C are diagrams illustrating part of an output file that is generated by the path setting apparatus in accordance with the first preferred embodiment of the present invention. FIG. 8A is a diagram illustrating the total number table file. FIG. 8B is a diagram illustrating the device list file. FIG. 8C is a diagram illustrating the transmission path plan table file.

As shown in FIG. 8A, the total number table file stores information that shows the number of all of the devices forming the entire management system MS. As shown in FIG. 8B, the device list file stores information that shows the battery life or the transmission delay (latency) of each of the wireless devices forming the management system MS or information that shows the height of an antenna set to each of the wireless devices. As shown in FIG. 8C, the transmission path plan table file stores information that shows a communication quality for each wireless path set between the wireless devices.

If the above processes using the path setting apparatus 5 end, the performance confirmation process (process S2) of the management system MS is executed. In the performance confirmation process (process S2), the output file F11 that is generated by the path setting apparatus 5 is provided to the operator such that it is confirmed by the operator whether the wireless network N1 of the designed management system MS satisfies a request from the operator. For example, in the performance confirmation process (process S2), it is confirmed by the operator whether the number, the arrangement, and the initial costs of wireless devices are within an allowable range, the transmission delays (latencies) of the wireless devices when the management system MS is operated are within an allowable range, and regular maintenance time and cost (battery exchange time and cost) required according to the battery life are within an allowable range.

If the performance confirmation process ends, the arrangement process (process S3) of the devices is executed. In the arrangement process (process S3) of the devices, the wireless devices and the wireless access point device forming the management system MS are arranged at the positions set using the path setting apparatus 5. In addition, arrangement of the network management apparatus 3 and the gateway device 4 forming the management system MS and laying of the backbone network N2 and the control network N3 are performed together.

If the arrangement process ends, a download process (process S4) of the path setting file F10 is executed. Specifically, in the download process (process S4), a process for connecting the path setting apparatus 5 to the backbone network N2 to enable communication with the network management apparatus 3 and downloading the path setting file F10 stored in the storage device 5e of the path setting apparatus 5 to the network management apparatus 3 is executed.

If the download process (process S4) ends, the fixing process (process S5) of the wireless paths is executed. During the fixing process (process S5) of the wireless paths, first, power is supplied to the wireless devices and the wireless access point device (the wireless devices 1a to 1d and the wireless access point device 2 shown in FIG. 1) that are arranged in the process S3 and a participation process for allowing the wireless devices 1a to 1d to participate in the wireless network N1 is executed under the management of the network management apparatus 3. By executing these processes, the wireless devices 1a to 1d that participate in the wireless network N1 and the network management apparatus 3 enter a communication enabled state.

Next, contents of the path setting file F10 that is downloaded from the path setting apparatus 5 in the process S4 are read in the network management apparatus 3 and a control signal according to the contents of the path setting file F10 is transmitted to the wireless devices 1a to 1d and the wireless access point device 2. Thereby, wireless paths that are equal to the wireless paths set in the path setting file F10 are fixed between the wireless devices 1a to 1d and between the wireless devices 1a to 1d and the wireless access point device 2. The wireless paths that are set in the above-described manner do not change, unless a control signal to instruct that the wireless paths be changed is transmitted from the network management apparatus 3 or an abnormality occurs and wireless communication through a main wireless path cannot be performed.

As described above, in the first preferred embodiment of the present invention, the path setting file F10 that defines the positions and the wireless paths of the wireless devices 1a to 1d is generated using the path setting apparatus 5 and the wireless paths that are defined by the path setting file F10 are fixed by the wireless network N1. Thereby, the wireless paths can be defined in the design step of the management system MS and the wireless paths do not change in principle when the management system MS is operated. Therefore, the transmission delays or the battery exchange periods of the wireless devices 1a to 1d can be accurately estimated and real-time responsiveness and maintenance can be secured. Since the wireless paths can be accurately understood, the regular work or the operative rule can be planned and the conservativeness can be secured.

The path setting apparatus, the path setting method, the management apparatus, the management system, and the storage device in accordance with the first preferred embodiment of the present invention have been described above. However, the present invention is not limited to the preferred embodiment and various changes can be freely made within the scope of the present invention. For example, in the preferred embodiment, the wireless access point device 2, the network management apparatus 3, the gateway device 4, and the path setting apparatus 5 are realized as the separate devices. However, two or more devices selected from these devices can be realized as one device.

In the preferred embodiment, the path setting file F10 that is generated using the path setting apparatus 5 is downloaded to the network management apparatus 3. However, the region that stores the path setting file F10 may be provided in the wireless devices 1a to 1d, the wireless access point device 2, or the gateway device 4 and the network management apparatus 3 may download the path setting file F10 from the region.

In the preferred embodiment, the wireless devices 1a to 1d and the wireless access point device 2 that perform the wireless communication based on ISA100.11a or WirelessHART have been described. However, the present invention can be applied to a management system that uses wireless devices and a wireless access point device that perform wireless communication based on a wireless communication standard that can form a wireless mesh network.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A path setting apparatus that sets wireless paths fixed by a wireless network formed by a wireless access point device and a plurality of wireless devices, the path setting apparatus comprising:
   an editing unit configured to edit and set positions of the wireless access point device and the wireless devices and wireless paths between the wireless access point device and the wireless devices and between the wireless devices, and to edit and set communication timings of the wireless access point device and the wireless devices where the wireless paths are set, based on an input instruction;
   a storage unit configured to store power performance information of the wireless devices;
   a calculating unit configured to receive the wireless paths and the communication timings set by the editing unit and configured to calculate transmission delays between the wireless devices and the wireless access point device or transmission delays between the wireless devices based on the wireless paths and the communication timings, the calculating unit being configured to receive the communication timings set by the editing unit and the power performance information stored in the storage unit and configured to calculate consumption power of the wireless devices and battery life of batteries used as power supplies of the wireless devices based on the communication timings and the power performance information; and
   a display unit configured to display the wireless access point device, the wireless devices, the wireless paths, and structures, which are positioned around the wireless access point device and the wireless devices, in a state in which the wireless access point device, the wireless devices, the wireless paths, and the structures overlap in a side view,
wherein the display unit is configured to display heights and distances of positions of the wireless access point device and the wireless devices in the side view.

2. The path setting apparatus according to claim 1, wherein the power performance information includes first information that shows power consumed when the wireless devices perform communication and second information that shows power consumed when the wireless devices perform a predetermined operation.

3. The path setting apparatus according to claim 1, wherein the editing unit sets a primary wireless path to be a main wireless path and a secondary wireless path to be an auxiliary wireless path, with respect to each of the wireless devices.

4. The path setting apparatus according to claim 1, further comprising:
a display unit configured to display the wireless access point device, the wireless devices, and the wireless paths, which are edited by the editing unit, and structures, which are positioned around the wireless access point device and the wireless devices, in a state in which the wireless access point device, the wireless devices, the wireless paths, and the structures overlap in a plan view or a side view.

5. A management apparatus that manages a wireless network formed by a wireless access point device and a plurality of wireless devices,
wherein the management apparatus transmits a control signal to each of the plurality of wireless devices to fix wireless paths equal to the wireless paths set by a path setting apparatus comprising:
an editing unit configured to edit and set positions of the wireless access point device and the wireless devices and wireless paths between the wireless access point device and the wireless devices and between the wireless devices, and to edit and set communication timings of the wireless access point device and the wireless devices where the wireless paths are set, based on an input instruction;
a storage unit configured to store power performance information of the wireless devices;
a calculating unit configured to receive the wireless paths and the communication timings set by the editing unit and configured to calculate transmission delays between the wireless devices and the wireless access point device or transmission delays between the wireless devices based on the wireless paths and the communication timings, the calculating unit being configured to receive the communication timings set by the editing unit and the power performance information stored in the storage unit and configured to calculate consumption power of the wireless devices and battery life of batteries used as power supplies of the wireless devices based on the communication timings and the power performance information; and
a display unit configured to display the wireless access point device, the wireless devices, the wireless paths, and structures, which are positioned around the wireless access point device and the wireless devices, in a state in which the wireless access point device, the wireless devices, the wireless paths, and the structures overlap in a side view,
wherein the display unit is configured to display heights and distances of positions of the wireless access point device and the wireless devices in the side view.

6. The management apparatus according to claim 5, comprising the wireless access point device.

7. A management system that manages a wireless network formed by a wireless access point device and a plurality of wireless devices, the management system comprising:
a path setting apparatus that sets wireless paths fixed by a wireless network formed by a wireless access point device and a plurality of wireless devices, the path setting apparatus comprising:
an editing unit configured to edit and set positions of the wireless access point device and the wireless devices and wireless paths between the wireless access point device and the wireless devices and between the wireless devices, and to edit and set communication timings of the wireless access point device and the wireless devices where the wireless paths are set, based on an input instruction;
a storage unit configured to store power performance information of the wireless devices;
a calculating unit configured to receive the wireless paths and the communication timings set by the editing unit and configured to calculate transmission delays between the wireless devices and the wireless access point device or transmission delays between the wireless devices based on the wireless paths and the communication timings, the calculating unit being configured to receive the communication timings set by the editing unit and the power performance information stored in the storage unit and configured to calculate consumption power of the wireless devices and battery life of batteries used as power supplies of the wireless devices based on the communication timings and the power performance information; and
a display unit configured to display the wireless access point device, the wireless devices, the wireless paths, and structures, which are positioned around the wireless access point device and the wireless devices, in a state in which the wireless access point device, the wireless devices, the wireless paths, and the structures overlap in a side view,
wherein the display unit is configured to display heights and distances of positions of the wireless access point device and the wireless devices in the side view.

8. A path setting method that sets wireless paths fixed by a wireless network formed by a wireless access point device and a plurality of wireless devices, the path setting method comprising:
a first step that edits and sets positions of the wireless access point device and the wireless devices and wireless paths between the wireless access point device and the wireless devices and between the wireless devices, and edits and sets communication timings of the wireless access point device and the wireless devices where the wireless paths are set, based on an input instruction;
a second step that receives the wireless paths and the communication timings set in the first step, calculates transmission delays between the wireless devices and the wireless access point device or transmission delays between the wireless devices based on the wireless paths and the communication timings, receives the communication timings set in the first step and the power performance information of the wireless devices, and calculates consumption power of the wireless devices and battery life of batteries used as power supplies of the wireless devices based on the communication timings and the power performance information of the wireless devices; and a displaying step of displaying the wireless access point device, the wireless devices, the wireless paths, and structures, which are positioned around the wireless access point device and the wireless devices, in a state in which the wireless access point device, the wireless devices, the wireless paths, and the structures overlap in a side view, wherein in the first step, heights of positions of the wireless access point device and the wireless devices, which have been displayed, can be set and edit, and in the displaying step, heights and distances of positions of the wireless access point device and the wireless devices in the side view are displayed.

9. The path setting method according to claim 8, wherein the power performance information includes first information that shows power consumed when the wireless devices perform communication and second information that shows power consumed when the wireless devices perform a predetermined operation.

10. The path setting method according to claim 8, wherein in the first step, a primary wireless path can be set to be a main wireless path and a secondary wireless path can be set to be an auxiliary wireless path, with respect to each of the wireless devices.

11. A path setting apparatus that sets wireless paths fixed by a wireless network formed by a wireless access point device and a plurality of wireless devices, the path setting apparatus comprising:

an editing unit configured to edit and set positions of the wireless access point device and the wireless devices and wireless paths between the wireless access point device and the wireless devices and between the wireless devices, and to edit and set communication timings of the wireless access point device and the wireless devices where the wireless paths are set, based on an input instruction;

a storage unit configured to store power performance information of the wireless devices;

a calculating unit configured to receive the wireless paths and the communication timings set by the editing unit and configured to calculate transmission delays between the wireless devices and the wireless access point device or transmission delays between the wireless devices based on the wireless paths and the communication timings, the calculating unit being configured to receive the communication timings set by the editing unit and the power performance information stored in the storage unit and configured to calculate consumption power of the wireless devices and battery life of batteries used as power supplies of the wireless devices based on the communication timings and the power performance information;

wherein the calculating unit is configured to calculate the consumption power of the wireless devices by using a following equation, Unit time consumption power=consumption power at time of transmission×number of transmissions per unit time+consumption power at time of reception×number of receptions per unit time+consumption power at time of driving sensor×number of drivings per unit time+consumption power at time of detection by sensor×number of detections per unit time. (Equation)

12. The path setting apparatus according to claim 11, wherein the calculating unit is configured to calculate the battery life of the batteries used as power supplies of the wireless devices by using a following equation, Battery life=(initial battery capacity÷unit time consumption power)×unit time. (Equation)

* * * * *